United States Patent
Leu et al.

(10) Patent No.: US 10,259,158 B2
(45) Date of Patent: Apr. 16, 2019

(54) METHOD AND APPARATUS FOR FABRICATING CERAMIC AND METAL COMPONENTS VIA ADDITIVE MANUFACTURING WITH UNIFORM LAYERED RADIATION DRYING

(71) Applicant: The Curators of the University of Missouri, Columbia, MO (US)

(72) Inventors: Ming C Leu, Rolla, MO (US); Amir Ghazanfari, Rolla, MO (US); Wenbin Li, Rolla, MO (US); Gregory E. Hilmas, Rolla, MO (US); Robert G Landers, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 200 days.

(21) Appl. No.: 15/130,261

(22) Filed: Apr. 15, 2016

(65) Prior Publication Data

US 2017/0297221 A1    Oct. 19, 2017

(51) Int. Cl.
*B29C 64/106* (2017.01)
*B29C 64/124* (2017.01)
(Continued)

(52) U.S. Cl.
CPC ............ *B29C 64/106* (2017.08); *B28B 1/001* (2013.01); *B29C 64/124* (2017.08);
(Continued)

(58) Field of Classification Search
CPC .... B29C 64/106; B29C 64/124; B29C 64/188
See application file for complete search history.

(56) References Cited

U.S. PATENT DOCUMENTS 6,253,116 B1 *   6/2001   Zhang .................... B33Y 10/00
                                                    700/119
6,401,002 B1   6/2002   Jang
(Continued)

OTHER PUBLICATIONS

T. Huang, M. Mason, X. Zhao, G. Hilmas, M. Leu, Aqueous Based Freeze-Form Extrusion Fabrication of Alumina Components, Jan. 2009, National Technical Information Service.

(Continued)

*Primary Examiner* — Christopher T Schatz
(74) *Attorney, Agent, or Firm* — C. John Brannon; Brannon Sowers & Cracraft PC (57) ABSTRACT

A freeform extrusion fabrication process for producing three-dimensional ceramic, metal and functionally gradient composite objects, including the steps of filling a plurality of paste sources with a respective plurality of aqueous paste compositions, operationally connecting respective syringes containing respective aqueous paste compositions to a mixing chamber, moving a first aqueous paste composition from a first respective paste source into the mixing chamber, moving a second aqueous paste composition from a second respective paste source into the mixing chamber, mixing the first and second aqueous paste compositions to define a first admixture having a first admixture composition, extruding the first admixture onto a surface to define an extruded layer having a first admixture composition, surrounding the sides of the extruded layer with an oil bath, radiatively drying the extruded layer.

7 Claims, 11 Drawing Sheets

(51) Int. Cl.
*B29C 64/188* (2017.01)
*B28B 1/00* (2006.01)
*B33Y 10/00* (2015.01)
*B33Y 30/00* (2015.01)
*B33Y 50/02* (2015.01)

(52) U.S. Cl.
CPC ............ *B29C 64/188* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 6,423,035 B1 | 7/2002 | Das |
| 6,454,972 B1 | 9/2002 | Morisette |
| 2010/0327479 A1 | 12/2010 | Zinniel |
| 2011/0079936 A1 | 4/2011 | Oxman |
| 2014/0183792 A1 | 7/2014 | Leu |

OTHER PUBLICATIONS

Freeze-Form Extrusion Fabrication of Composite Structures, Ming C. Keu et al, Solid freeform fabrication; an additive manufacturing conference, Conference Date: Aug. 2011.

\* cited by examiner

METHOD AND APPARATUS FOR FABRICATING CERAMIC AND METAL COMPONENTS VIA ADDITIVE MANUFACTURING WITH UNIFORM LAYERED RADIATION DRYING

This invention was made with Government support under Grant No. DE-FE 0012272 awarded by the US Department of Energy. The U.S. Government has certain rights in the invention.

TECHNICAL FIELD

The present novel technology relates generally to the field of material science and engineering, and, more particularly, to an extrusion-based additive fabrication for producing ceramic, metal and composite parts from multiple aqueous suspension precursors, paste precursors, or the like.

BACKGROUND

There is an increasing need for complex three-dimensional (3D) parts having high-performance mechanical and thermal properties. One attempt at meeting this need has been to combine unique properties of different materials to yield 3D parts of functionally gradient properties. Because some materials have desirable properties in some aspects (such as resistance to high temperatures) but less desirable properties in other aspects (such as toughness and/or shock absorption), attempts have been made to combine and grade different materials to make parts for use under critical or extreme service conditions. These attempts have met with limited success.

Several additive manufacturing techniques have been developed or modified to fabricate three-dimensional ceramic components, including 3D Printing, Ink-jet Printing, Selective Laser Sintering (SLS), Stereolithography (SLA), Laminated Object Manufacturing (LOM), and extrusion-based techniques. All of these techniques involve adding materials layer by layer.

Extrusion-based methods are among the most popular approaches due to the simplicity and low cost of their fabrication system, high density of their products, their capability of producing parts with multiple materials and functionally graded materials, and low amount of material wastage during pre-processing and processing. Major extrusion-based processes that have been developed include Extrusion Freeform Fabrication (EFF), Fused Deposition of Ceramics (FDC), Robocasting (RC), and Freeze-form Extrusion Fabrication (FEF).

EFF is the first technique developed to utilize extrusion of ceramic slurries to produce three-dimensional components. In this process, slurries of ceramic powders (such as alumina, silicon nitride, and the like) are prepared in liquid acrylic monomers and other organic-based media, and then deposited onto a (sometimes preheated) platen. This process is also the first extrusion-based process to produce ceramic-based functionally graded materials such as ceramic oxides graded to Inconel or stainless steel.

FDC uses a modified Fused Deposition Modeling (FDM) system to extrude ceramic-loaded thermoplastic filaments. The filament is liquefied, extruded, and re-solidified to retain its shape.

In RC, typically an aqueous suspension is prepared from ceramic materials (e.g. alumina, silica, lead zirconate titanate, hydroxyapatite, silicon carbide, and silicon nitride) and extruded onto a hot plate to dry and maintain its shape. The main advantage of RC over EFF and FDC is using low amount of binder in the feedstock, which facilitates pre-processing and post-processing.

In the FEF process, an aqueous paste is extruded in a freezing environment to solidify the paste after its deposition. Freeze-drying is then used to remove the water content before sintering. This process is also capable of producing complex and functionally graded parts made of different materials such as alumina, zirconium diboride, boron carbide, zirconium carbide, and bio-active glasses.

The above processes each have their own limitations. The binder removal stage for the EFF and FDC processes is difficult and time-consuming, and sometimes causes severe warpage or other defects. Also, it might require multiple cycles with different atmospheres. For the FDC process, the feedstock preparation is also burdensome and requires several steps. The filament must maintain a high dimensional tolerance to ensure consistent flowrates. Although components of multiple materials could be produced, an FDC system is not capable of mixing these materials to fabricate functionally graded parts. RC is not capable of building large solid parts due to its non-uniform drying, which often causes warpage and cracks in the parts. Furthermore, due to inconsistency in extrudate flowrate and inevitable presence of air bubbles in the suspension, the products are not fully dense and their mechanical strength cannot match that produced by the EFF and FDC processes. These challenges add to ice crystal formation and weak layer bonding in FEF, further decreasing the density and mechanical properties. Furthermore, all of the above processes suffer from nozzle clogging resulted from paste agglomerates in the feedstock and freezing or drying inside the nozzle. Thus, there remain needs for an improved method of manufacturing a complex three-dimensional part. The present novel technology addresses this need.

DETAILED DESCRIPTION

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

The present novel technology relates to a system, method and apparatus for extruding aqueous pastes or slurries of one or more compositions and depositing them, layer by layer, to yield a three-dimensional (3D) part. In some embodiments, the pastes are homogeneous and yield a part having a homogeneous composition, while in other embodiments, multiple aqueous pastes of different materials are extruded and may or may not be mixed during extrusion at predetermined proportions, and are subsequently deposited layer-by-layer under automatic control inside an oil-tight chamber partially filled with oil. The paste layers are extruded and an oil environment is introduced to surround the sides of the part during deposition to fabricate 3D composite parts having functionally graded properties. The oil level is increased along with the height of the growing fabricated part so that the sides of the part are always immersed in oil. This technique allows for building 3D parts of complex geometry from multiple source materials that can be graded as desired. The novel technique addresses the issue of parts deforming due to uneven drying from the sides and edges by maintaining an oil bath around the growing, as-deposited part. This is done by extruding aqueous-based pastes into an oil-tight chamber, and introducing oil during and/or after the deposition of each layer to keep the sides in physical contact and in thermal communication with the resultant oil bath. This technique has been successfully demonstrated for fabrication of parts using monolithic material such as $Al_2O_3$ and $ZrO_2$.

The present novel technology relates to both a process and tool for fabricating 3D composite parts that may be homogeneous, may have discrete portions having different material compositions, and/or may be functionally graded materials, as deposited in a layer-by-layer fashion such as by using a computer controlled apparatus with a single or multiple extruders to fabricate 3D ceramic and/or metallic parts from a single or multiple aqueous pastes to fabricate 3D composite parts. When using multiple, typically aqueous, pastes, each paste respectively typically incorporates different raw or source materials. Simultaneous with deposition, an oil bath is typically maintained at the level of the last extruded layer to maintain an oil barrier in physical and thermal contact with the sides of the forming green piece. This novel technology enables producing 3D components from a single material, multiple materials, or functionally graded materials with desired electrical, chemical, mechanical, thermal and other like properties.

Several ceramic materials, including $Al_2O_3$, $ZrO_2$, 13-93 bioactive glass, and the like, have successfully lent themselves to the manufacture of complex three-dimensional bodies according to this technique. Example applications include leading edges for hypersonic vehicles, missile nose cones, nozzle throat inserts for spacecraft propulsion systems, prosthetic hip and knee joints, dental implants, hydraulic pump parts, extrusion dies, and mechanical bearings.

In one example, advanced aerospace systems such as hypersonic air vehicles are required to operate at extremely high flight speeds and under extremely high temperatures. The desired hypersonic speed will result in high heat fluxes at the leading and trailing edges, requiring thermal protection systems that can withstand very high temperatures. In another example, the desire for increased propulsion leads to extremely high temperature environments in which components such as combustors and propulsion nozzles must survive. Ultra-High Temperature Ceramics (UHTCs) such as HfC, ZrC, TaC, $ZrB_2$, $HfB_2$, and HfN exhibit very good refractory properties, high melting points, reasonable oxidation and thermal shock resistance, low coefficient of thermal expansion, and good creep and fatigue properties. However, the use of monolithic UHTCs in the extreme environments has some disadvantages. Monolithic UHTCs typically do not possess the thermal shock resistance needed to survive the high temperature gradients due to the extreme heating cycles required for high-performance propulsion systems. Further, UHTCs typically are difficult to attach to the typically metallic underlying substructure. A functionally graded material architecture of UHTC-refractory metal composite can minimize thermal stresses in applications that involve extremely high temperatures and high heat flux and allow for attachment to an underlying metal substructure.

One potential biomedical application relates to the fabrication of a functionally graded prosthetic hip joint. There are mechanical stresses and impacts inherent at the junction of the prosthetic joint with the surrounding bone, thus a material with high toughness and flexural strength (such as $ZrO_2$) is desired for the prosthetic piece. However, due to movements of the joint, there is a continuous wear at the surface, recommending a material with high hardness (such as $Al_2O_3$) for the contact surface. A grading from a tough material to a hard material can result in a prosthetic hip joint that is both tougher and more durable.

The present novel technology relates to the process and apparatus for fabricating 3D composite parts, typically having functionally gradient properties, by providing materials prepared in the form of aqueous pastes and depositing the pastes layer by layer. In some embodiments, these respective pastes have different respective compositions and may be mixed to yield a part having a predetermined compositional gradient. The novel process typically uses aqueous pastes, typically with very low organic binder content (typically less than four volume percent, more typically less than one volume percent). Unlike the robocasting process, the novel process builds a green part in an oil bath environment to retard or prevent an evaporative moisture gradient from developing in the drying paste during the "green" part fabrication process. The green part is fabricated, such as by using a single-extruder, a triple-extruder, or the like, in a layer-by-layer manner. The fabricated part is then maintained in an oil bath with the oil level provided high enough to cover the otherwise exposed sides of the growing green body. After each layer is deposited, the green piece is subjected to a thermal radiation treatment, such as an IR bath, to uniformly and at least partially dry the deposited layer. Once the piece is completely formed, the oil bath is drained and the piece is bulk dried to remove remaining water. The binder is then removed through a burnout process. The calcined or "brown" part is then sintered to obtain a final part.

Figure 1:
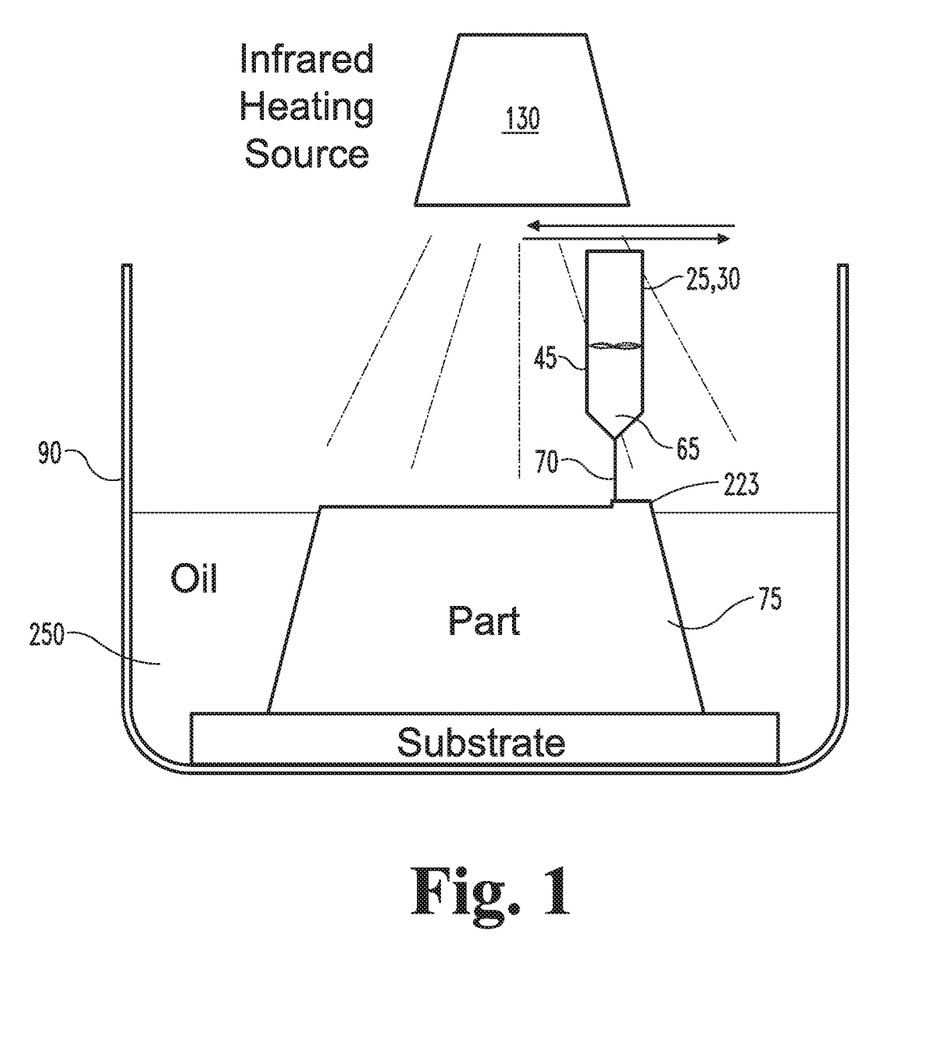
FIG. 1 is a schematic view showing one embodiment freeform extrusion fabrication system for making three-dimensional functionally gradient composite parts according to the present novel technology.
Figure 2:
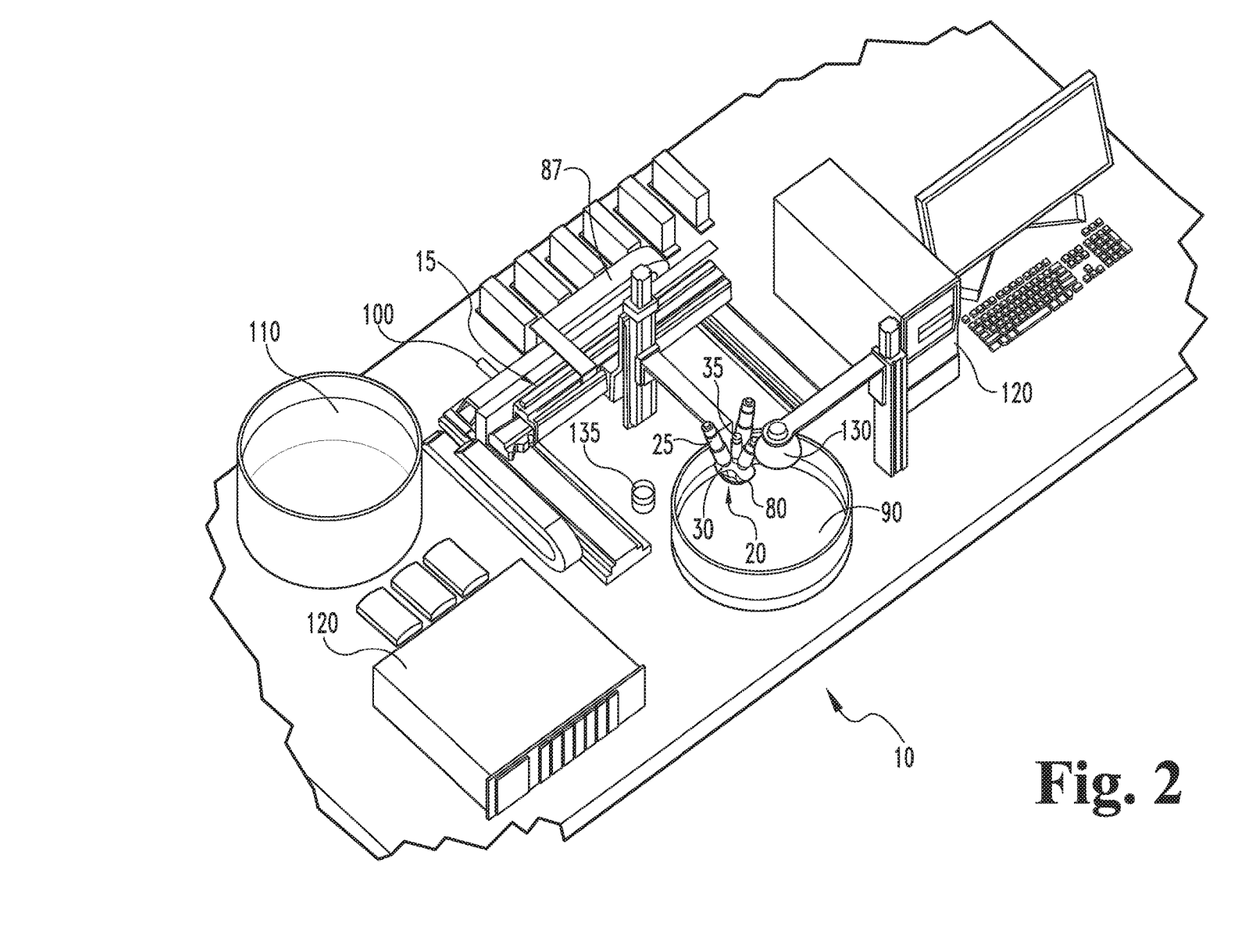
FIG. 2 is a perspective view of the embodiment of FIG. 1.

Drawing FIGS. 1-6 illustrate a first embodiment multi-extruder system 10 of the present novel technology. FIG. 1 illustrates a schematic view of the multi-extruder apparatus 10 for making three-dimensional functionally gradient composite parts. Gantry system 15 supports and positions extrusion assembly 20, which is operationally connected to one or more paste reservoirs 25. The extrusion assembly 20 may include a single paste receptacle or extruder 30 or, more typically, multiple paste extruders 30 and one or more (typically servo) motors 35 for driving mixing blades 40 operationally connected thereto for mixing the extrudate output of the extruders 30 as fed into mixing station 45 to yield a homogeneous extrudate mixture therefrom. In some embodiments, the paste receptacles 30 and paste reservoirs 25 are unitary, such as syringes feeding into the mixing station 45, while in other embodiments, the receptacles 30 are holding tanks for receiving paste pumped from a paste reservoir 25.

Figure 3:
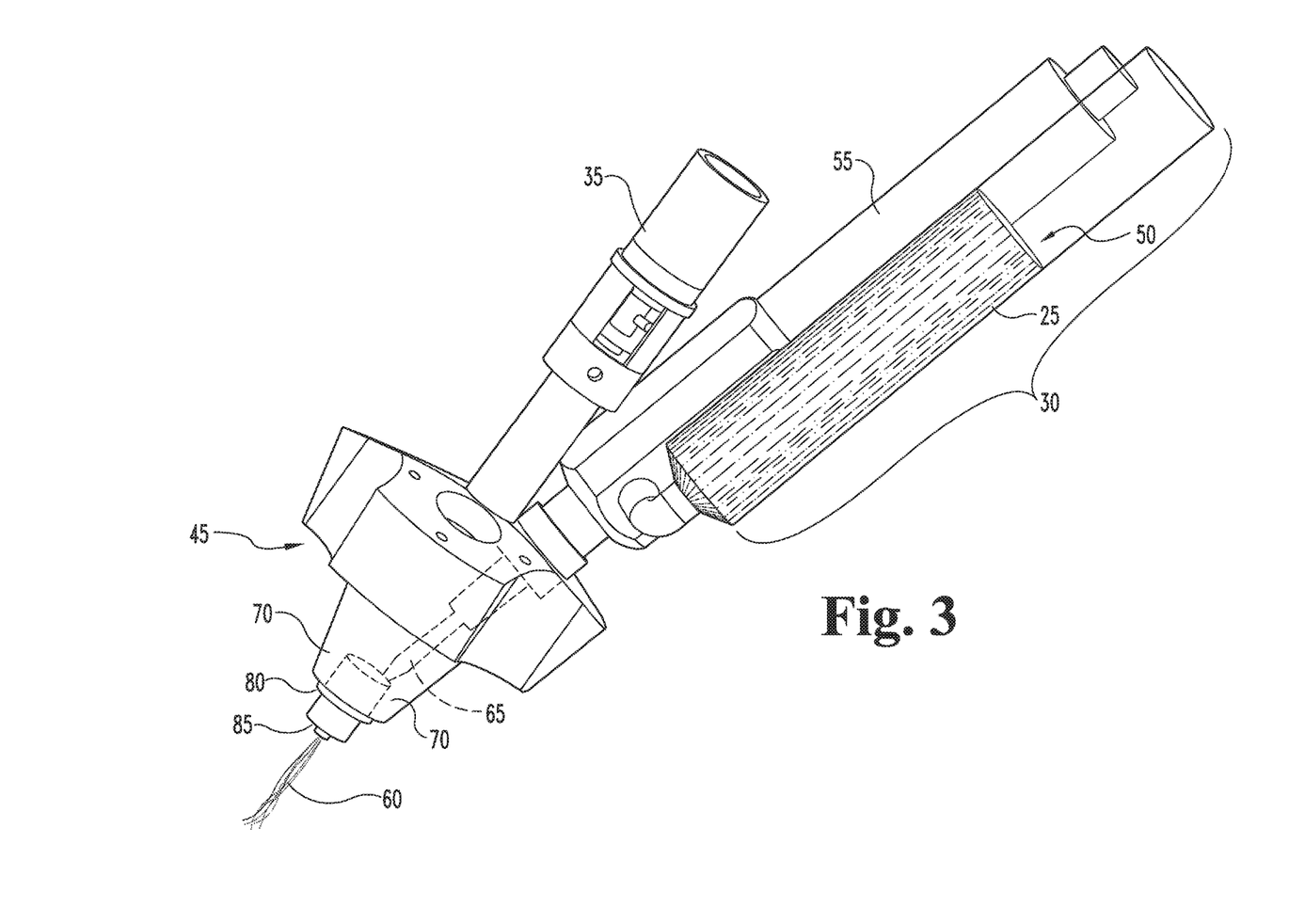
FIG. 3 is an enlarged cutaway view of the paste extruder and mixing system of the embodiment of FIG. 1.
Figure 4:
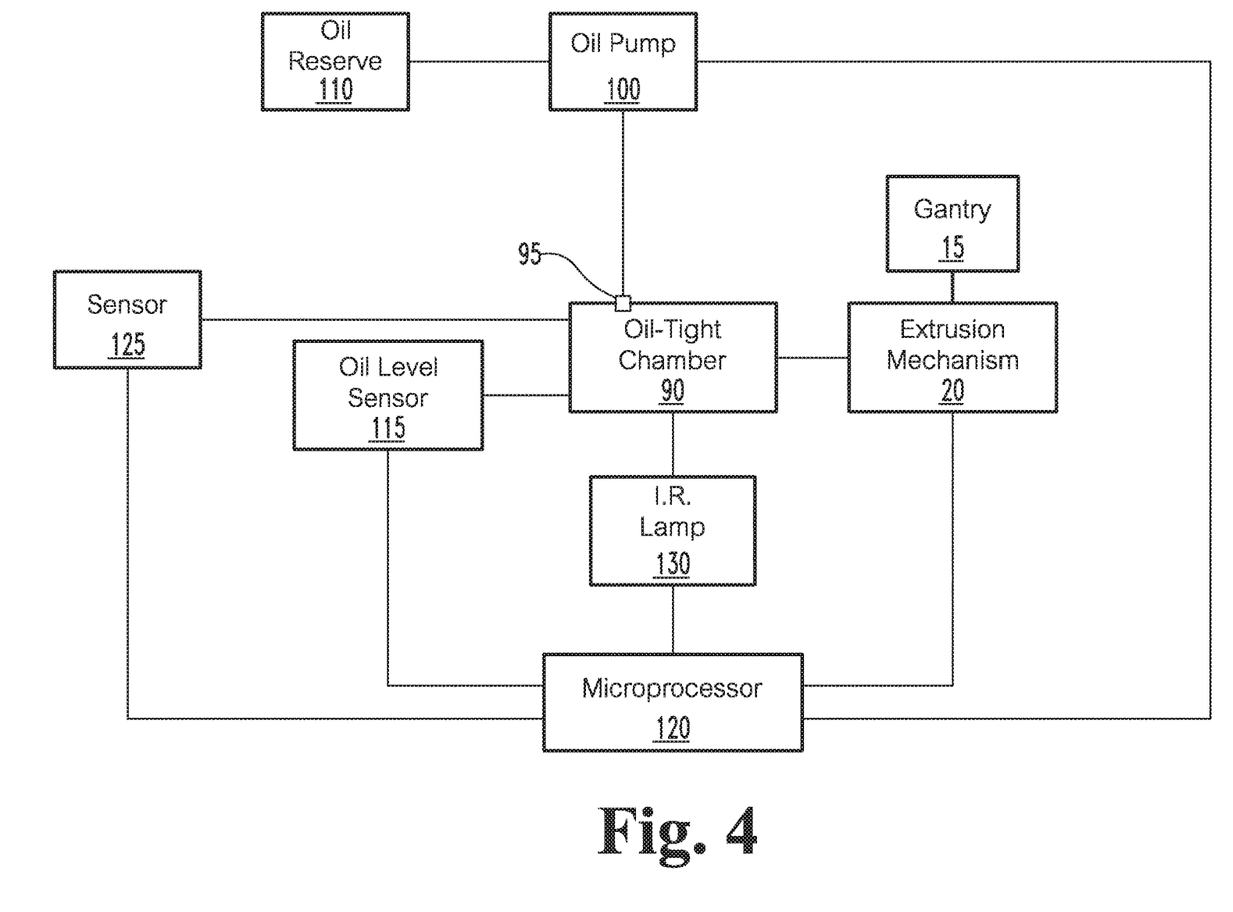
FIG. 4 is a schematic diagram of the system of FIG. 1
Figure 5:
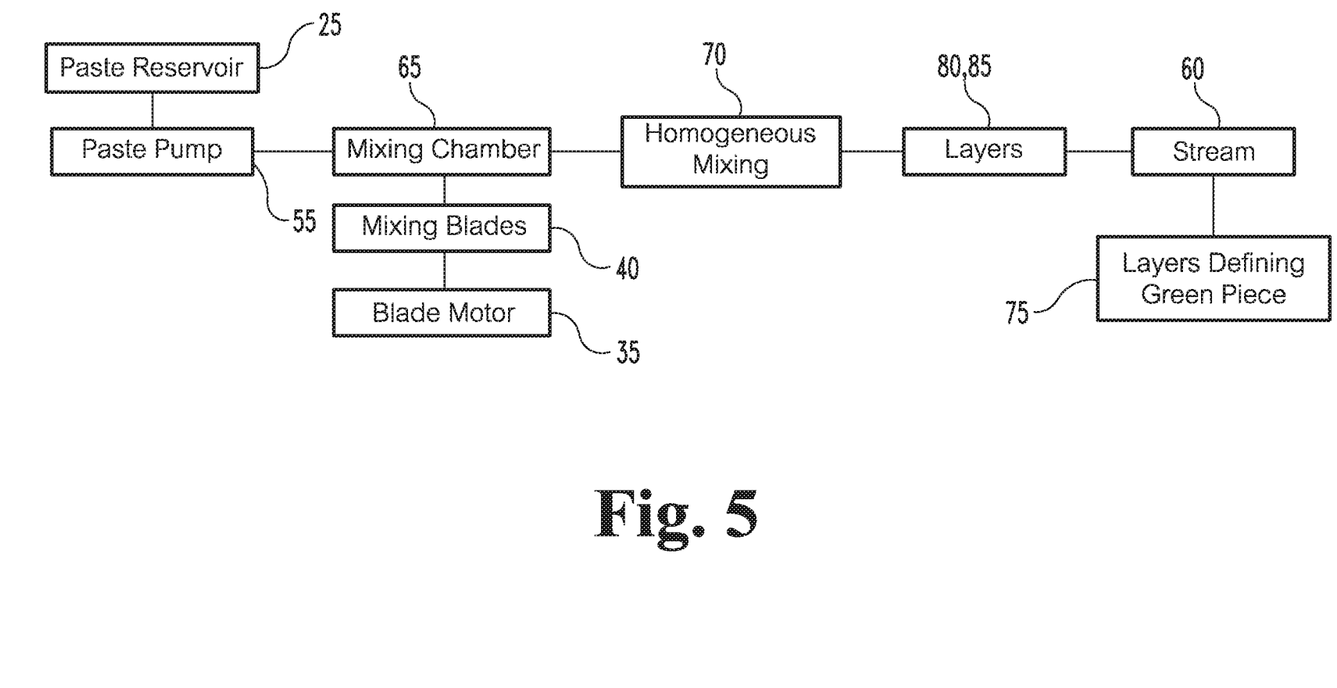
FIG. 5 is a schematic diagram of FIG. 3.

In the multi-extruder embodiment, the extrusion assembly 20 typically includes a dynamic mixer 45 for mixing multiple pastes 50 from multiple paste sources 25, such as syringe extruders 30 or fluidically connected reservoirs or the like. Paste sources 25 are typically connected in fluidic communication to paste urging mechanisms 55, such as pumps, plungers, pressurizers, or the like. Mixing is first done by merging pastes 50 into a homogeneous stream 60 as the different pastes 50 pass into the mixing chamber 65 where mixing blades 40 blend respective pastes 50 into a homogeneous mixture 70, so that a nearly homogeneous uniformity of the green part 75 may be obtained. The mixer 40 is typically low shear, such as a series of continuous in-line units which mix pastes 50 that can be extruded or pumped to the required consistency. Materials to be mixed into pastes 50 include combinations of fluids, powders, granules, and gases. The mixer 40 typically requires no external power source, although a dynamic mixer 40 may also be used instead as required.

Mixing chamber 65 also includes a nozzle 80 operationally connected thereto, which may terminate in a high-pressure needle nozzle 85 to more precisely control the deposition of the extrudate, such as the positioning and/or thickness of the deposition layer. Gantry 15 is operationally connected to motor 87 for moving and positioning nozzle 80, 85 in the Cartesian X, Y, and Z directions.

Nozzle 80 is positioned over an open-topped oil tank 90. Oil tank 90 includes an oil inlet port 95 fluidically connected to an oil pump 100, which is fluidically connected to an oil reserve 110. Oil level sensor 115 is operationally connected to oil tank 90.

Microprocessor 120 is operationally connected to mixing motor 45, paste pump 55, gantry motors 87, oil pump 110, oil level sensor 115, and any other sensors 125, such as positioning sensors operationally connected to the nozzle and/or gantry, green body height sensors, moisture sensors, or the like.

A (typically) infrared heating lamp 130 is positioned to shine into the oil tank 90 and evenly onto the green body 75 as it is constructed by layer by layer deposition. Microprocessor 120 is operationally connected to infrared lamp 130. A water sink 135 is typically provided within which to rest the nozzle 80, 85 when not in use to arrest or retard drying out and clogging.

Figure 6:
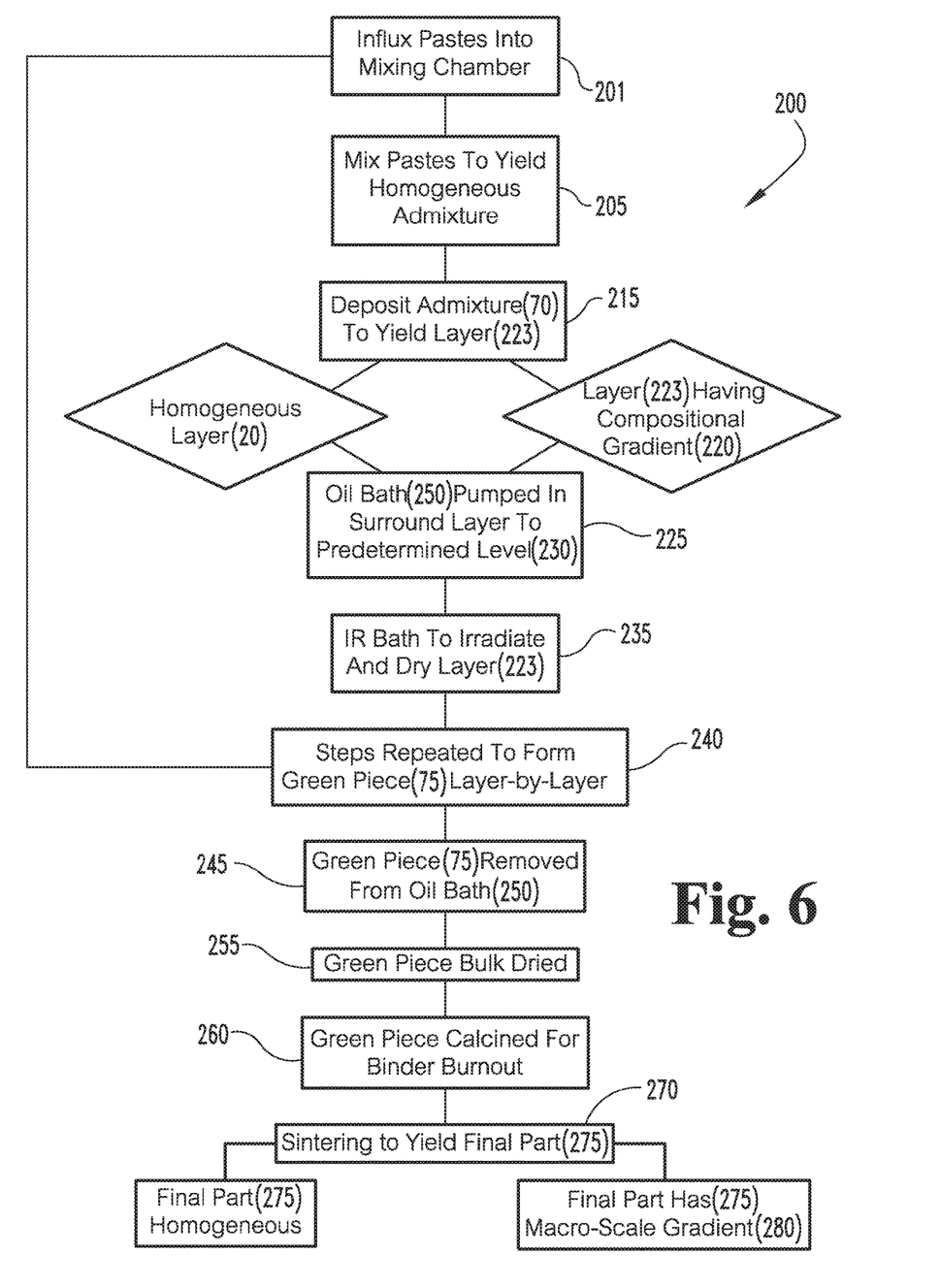
FIG. 6 is a process flow diagram of the operation of the system of FIG. 1.

FIG. 6 shows the operation of fabricating 200 a part 75 with gradient materials 50A, 50B, 50C using the freeform extrusion system 10. The process 200 extrudes one or a plurality of different aqueous pastes 50 to yield a finished green body 75. For example, three compositionally different pastes 50A, 50B, 50C are continuously fed 201 into the mixing chamber 65 at different respective rates, typically via automatic computer control 120 and are mixed 205 to yield a homogeneous admixture 70 which is then deposited 215 in sequential layers to build a green part 75 with continuous compositional gradients 220 as the composition of the admixture 70 is varied.

After each layer 223 of predetermined (and potentially variable) thickness 225 (typically between about 150 microns and 400 microns, although thinner or thicker layers, up to 2 mm or more, may be deposited as desired) is deposited 215, oil is pumped 225 into the chamber 90 to a predetermined level 230 sufficient to envelop the sides of the newly deposited layer 223. Then, the layer 223 is irradiated 235 to at least partially dry the layer 223, after which another layer 223 is deposited 215, more oil is pumped 225 into the chamber 90, and the new layer 223 is irradiated 235. These steps are repeated until the green piece 75 is built. It should be noted that each layer 223 may have its own unique compositional gradient topography 240. Once completed, the green piece 75 is removed 245 from the oil bath 250, bulk dried 255 (such as in a drying oven at about no degrees Fahrenheit or the like), and then undergoes binder burnout 260.

After binder burnout 260 and subsequent sintering 270 of the green part 75 built 200 by the triple-extruder system 10, the final part 275 typically has a compositional gradient 280 as predetermined, having dimensions and compositions that are predetermined.

To fabricate a functionally graded composite part 75 using system 10, three compositionally different pastes 50A, 50B, 50C are typically used, although in alternate systems, two, four or more pastes 50 may be combined. The respective pastes 50A, 50B, 50C typically each have an engineered composition and a predetermined rheological behavior in order for the mixed paste 70 to pass through a fine nozzle 85 to yield a 3D geometry as deposited layer-by-layer. Typically, pastes 50 have high solids loading, exhibit little or no phase separation under pressure, and behave like pseudoplastics with high yield stresses. For example, methocell is an efficient binder for transforming the rheological behavior of many pastes 50 to exhibit pseudoplastic behavior with high yield stress. A controllable yield stress is helpful for the extrudate 223 to maintain its shape under pressure during the paste extrusion process for fabricating the 3D part.

EXAMPLES

Figure 7:
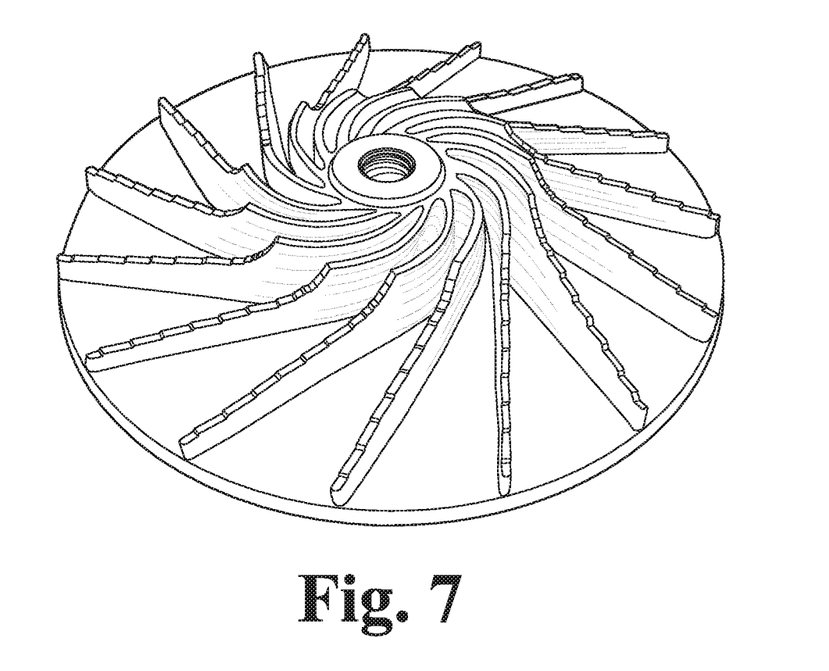
FIG. 7 is a perspective view of an impeller in the green state formed according to the present novel technology.

To examine the performance of the above-described novel technology, complex parts with numerous starts and stops have been fabricated. FIG. 7 shows one example of such a complex part, an impeller body in the green state having no visible printing flaws.

Figure 8:
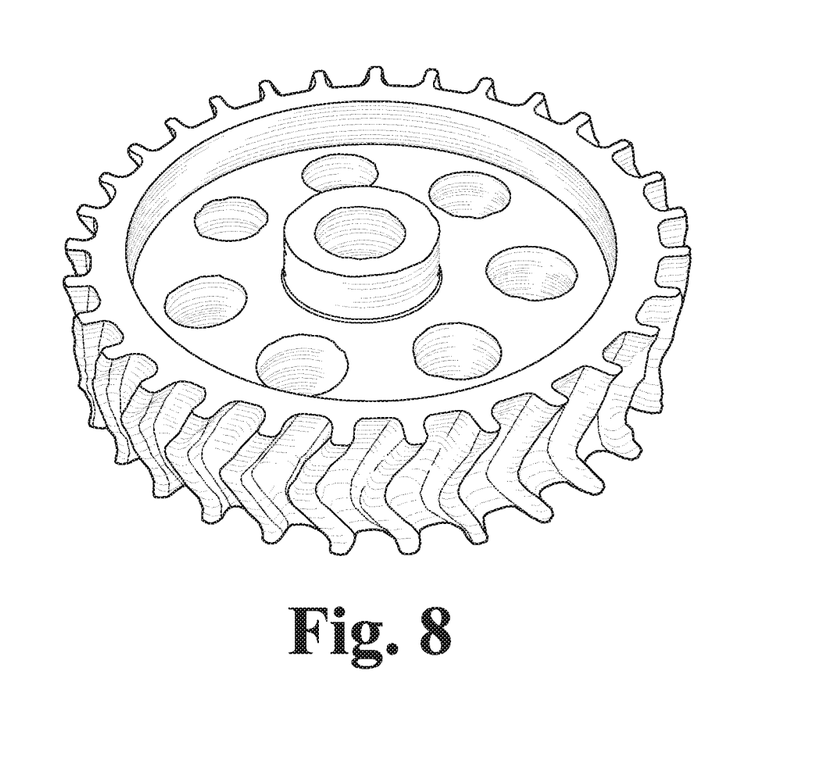
FIG. 8 is a perspective view of a sintered gear formed according to the present novel technology.

To investigate the capabilities of the novel technology to fabricate solid parts with complex geometries, a solid gear was chosen and successfully built. As shown in FIG. 8, the sintered wear gear part is free of pores between contours and lines.

Figure 9A:
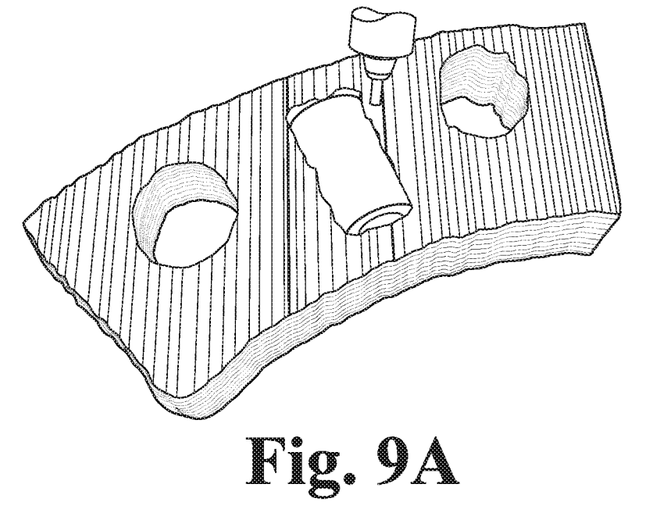
FIGS. 9A-9C are perspective views of refractory lining blocks with embedded sensors formed according to the present novel technology.
Figure 9B:
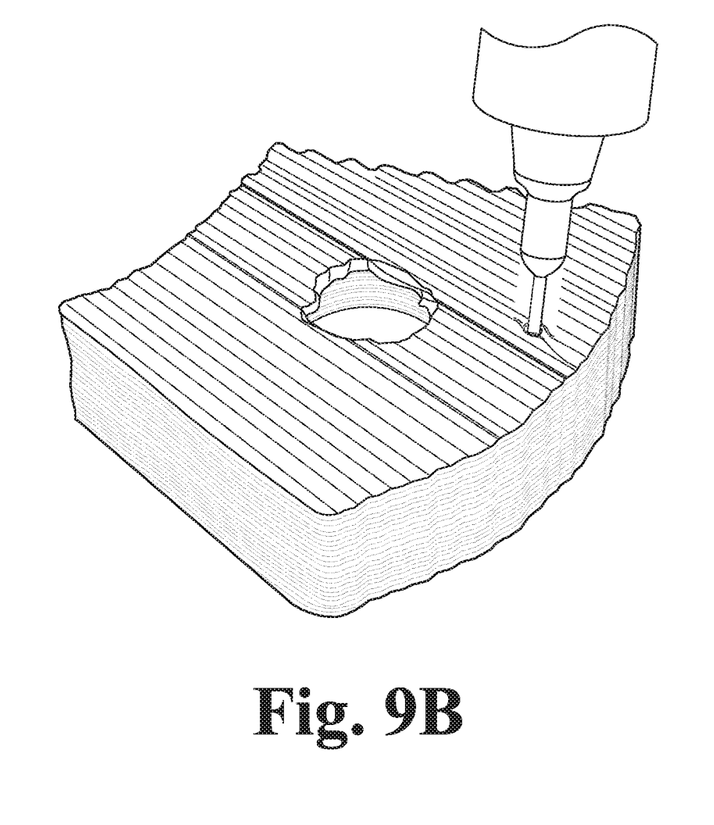
Figure 9C:
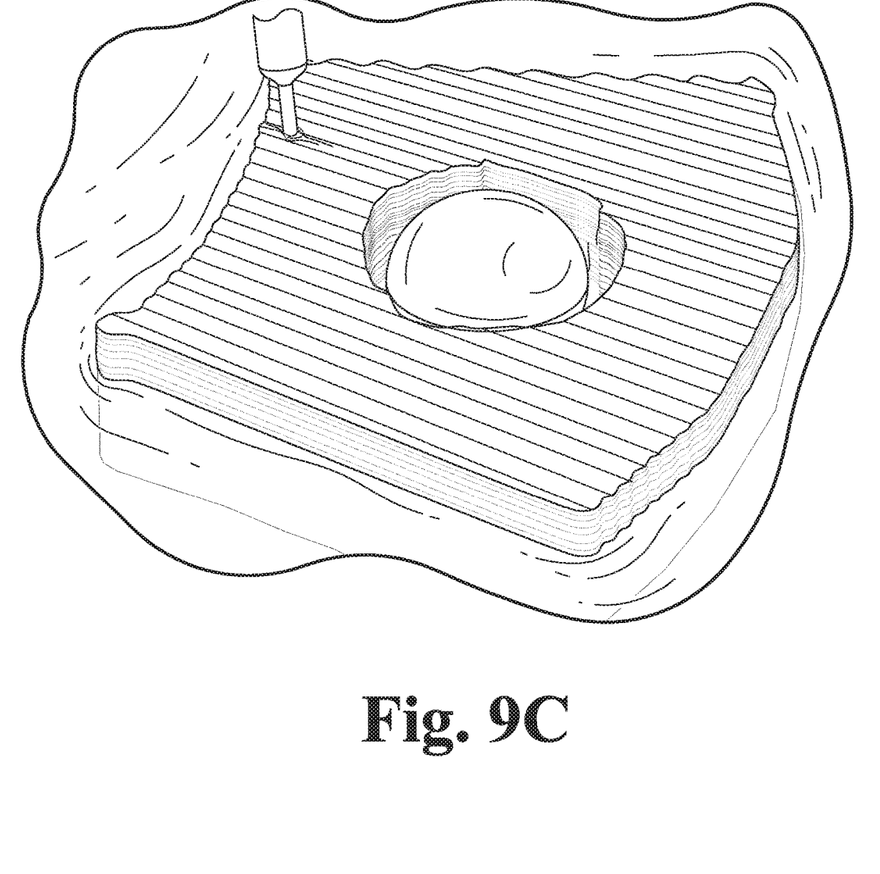

In yet another practical application of the novel technology, smart refractory lining blocks were fabricated with sensors embedded during the fabrication process. The sensors are for monitoring temperature, pressure, and spalling of walls in the integrated gasification combined cycle of coal and other carbon-containing fuels. FIGS. 9A-9C illustrate several lining blocks in which sensors were successfully embedded during the fabrication process.

Figure 10A:
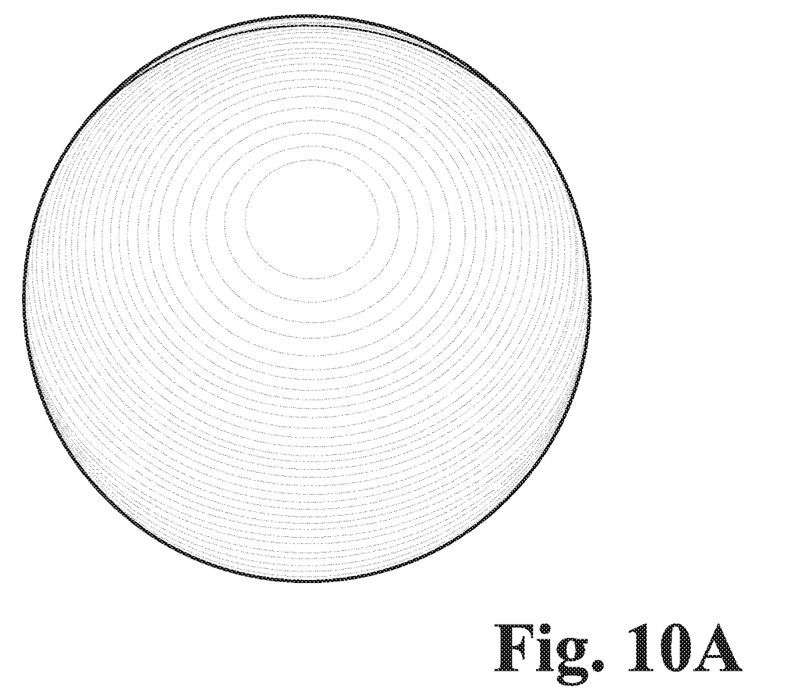
FIGS. 10A-B are perspective views of a solid spherical part resembling a prosthetic hip joint in the green state formed according to the present novel technology.
Figure 10B:
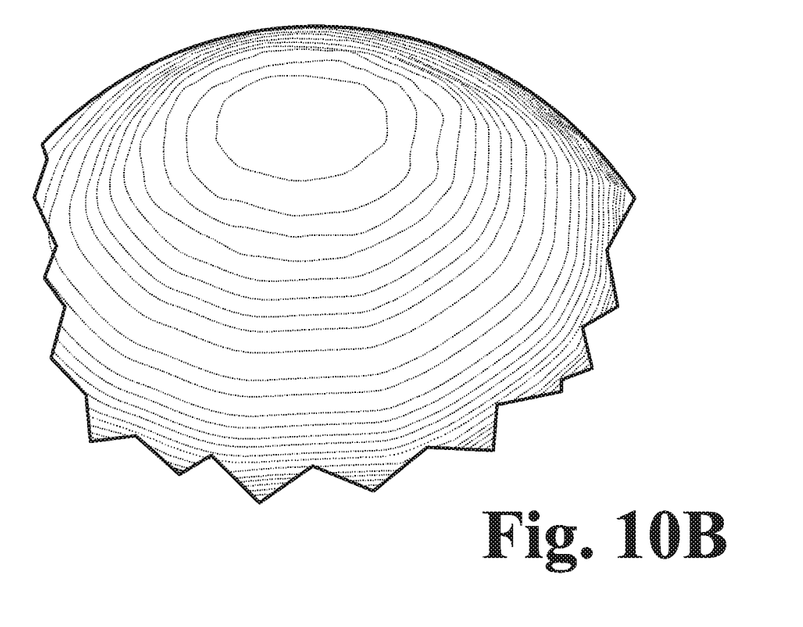

Alumina is a common material used to produce prosthetic hip joints due to its hardness and biocompatibility. As another example, a spherical solid part resembling a prosthetic hip joint has been fabricated with alumina using the novel technology (see FIGS. 10A-10B). An advantage of this process is producing a relatively strong green part that may easily be ground to improve the surface quality. FIGS.

Figure 11A:
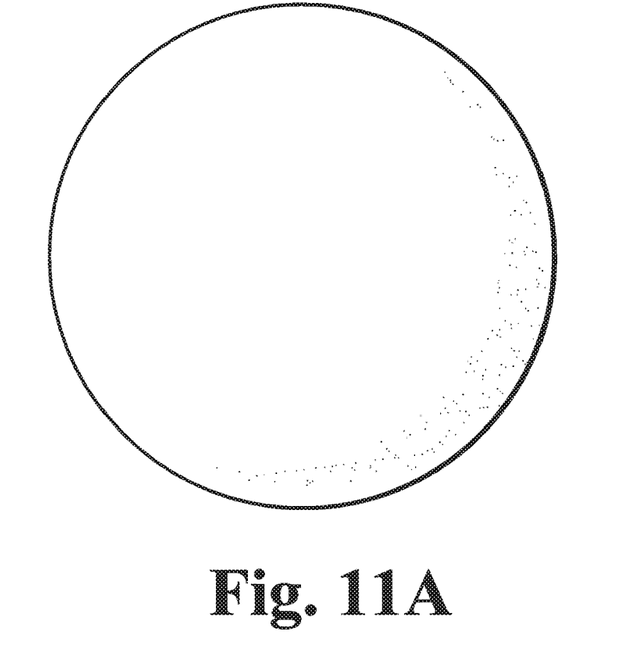
FIGS. 11A-B are perspective views of the sphere of FIGS. 10A-B after manual grinding in the green state.
Figure 11B:
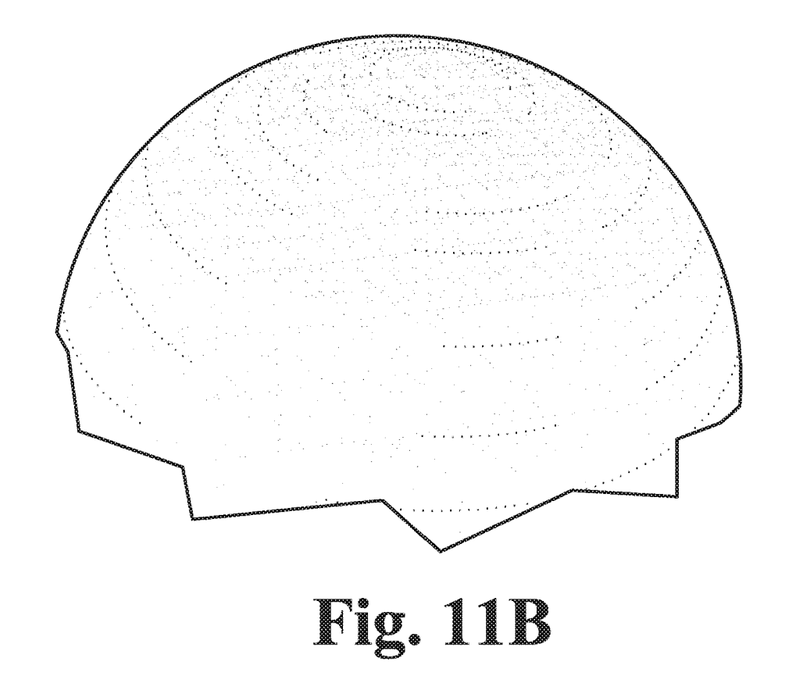

11A-11B show the same part after manual grinding, which has significantly improved the surface quality.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A multilayered extrusion fabrication process for producing three-dimensional ceramic and metal objects, comprising:
    a) preparing an aqueous paste;
    b) extruding the aqueous paste onto a target surface in an oil tank to define an extruded layer having a top surface and at least one side surface;
    c) filling the oil tank with sufficient oil to submerge the at least one side surface of the extruded layer in oil;
    d) uniformly drying the extruded layer with an application of thermal energy through the top surface remove moisture contained therein; and
    e) repeating steps b) through d) to define a green body made of a plurality of stacked, dried layers.

2. A multilayered extrusion fabrication process for producing three-dimensional compositionally gradient ceramic and metal objects, comprising:
    a) preparing an aqueous paste, wherein the aqueous paste has a first composition;
    b) extruding the aqueous paste onto a target surface in a liquid tank to define an extruded layer having a top surface and at least one side surface;
    c) filling the liquid tank with sufficient oil to cover the at least one side surface of the extruded layer in liquid while leaving the top surface liquid-free;
    d) heating the extruded layer to remove moisture through the top surface to yield a dried layer;
    e) changing the composition of the aqueous paste to a second composition; and
    f) repeating steps b) through e) to define a green body made of a plurality of stacked dried layers.

3. The process of claim 2, wherein steps b) and e) occur simultaneously.

4. The process of claim 2 and further comprising:
    g) draining liquid from the liquid tank; and
    h) drying the green body to remove residual moisture.

5. The process of claim 2 wherein the second composition is different from the first composition.

6. The process of claim 2 wherein the green body is less than four volume percent binder.

7. The process of claim 2 wherein the green body is less than one volume percent binder.

* * * * *